United States Patent [19]

Iketani

[11] Patent Number: 4,903,136

[45] Date of Patent: Feb. 20, 1990

[54] AUTOMATIC SENSITIVITY CONTROLLER FOR ELECTRONIC STILL CAMERA

[75] Inventor: Kohei Iketani, Kawagoe, Japan

[73] Assignee: Asahi Kogaku Kogyo K.K., Tokyo, Japan

[21] Appl. No.: 238,531

[22] Filed: Aug. 31, 1988

[51] Int. Cl.$^4$ .......................................... H04N 5/235
[52] U.S. Cl. ...................................... 358/228; 358/225
[58] Field of Search .................. 358/228, 213.19, 227, 358/909, 225; 354/402, 403

[56] References Cited

U.S. PATENT DOCUMENTS

| | | | |
|---|---|---|---|
| 4,168,235 | 10/1986 | Ishida et al. | 354/403 |
| 4,609,944 | 9/1986 | Nakada et al. | 354/402 |
| 4,621,292 | 11/1986 | Hirao et al. | 358/227 |
| 4,768,876 | 10/1987 | Okino | 358/225 |
| 4,780,766 | 5/1987 | Nutting | 358/228 |

Primary Examiner—Jin F. Ng
Assistant Examiner—Stephen Brinich
Attorney, Agent, or Firm—Sandler & Greenblum

[57] ABSTRACT

An automatic sensitivity controller for use in an electronic still camera system which performs flash photography. This device is designed to expand the range of the photographable subject-to-camera distance even if a small-emission electronic flash is employed and is provided with an image pickup device, a distance metering element for measuring the camera-to-subject distance, a variable-gain amplifier circuit having a control terminal and amplifying a video signal supplied from the image pickup device at a gain determined in response to a control signal applied to the control terminal; and a gain control device for applying a control signal relating to a measured value of the camera-to-subject distance to the control terminal.

5 Claims, 3 Drawing Sheets

AUTOMATIC SENSITIVITY CONTROLLER FOR ELECTRONIC STILL CAMERA

BACKGROUND OF THE INVENTION

This invention relates to an automatic sensitivity controller for use in an electronic still camera system which performs flash photography.

In a photography process of taking a picture of a subject by using an electronic camera in a movie mode while continuously irradiating the subject with light, a low-band luminance signal $Y_L$ is extracted from a video signal which is output from an image pickup device such as a CCD via an AGC (automatic gain control) circuit, and is supplied (as a feedback) to a gain control terminal of the AGC circuit via a detection circuit so that the level of the output from the AGC circuit becomes generally constant.

In still-mode flash photography, it is not possible to adjust the gain of the AGC circuit since the light emission time is very short and, therefore, this gain is preset and fixed to a standard value.

However, if a small-emission electronic flash such as an electronic flash incorporated in a camera body is used to perform flash photography, the range of the photographable camera-to-subject distance is considerably restricted.

If, as in an ordinary case, the equivalent guide number is 12 and if the aperture value ranges from F2.8 to F16, the range of this distance L is 0.75 to 4.3 m and is thus narrow.

If a large-emission type of electronic flash is incorporated in the electronic camera in order to widen this range, the overall size of the camera as well as the manufacturing cost is increased.

SUMMARY OF THE INVENTION

In view of these problems, it is an object of the present invention to provide an automatic sensitivity controller for an electronic still camera which is capable of expanding the range of the photographable subject-to-camera distance even if a small-emission electronic flash is employed.

To this end, the present invention provides an automatic sensitivity controller for an electronic still camera which performs flash photography, the automatic sensitivity controller having, as shown in FIG. 1, an image pickup device, distance metering means for measuring the camera-to-subject distance, a variable-gain amplifier circuit having a control terminal and amplifying a video signal supplied from the image pickup device at a gain determined in response to a control signal applied to the control terminal, and a gain control means for applying a control signal relating to a measured camera-to-subject distance to the control terminal.

In accordance with the present invention, the gain of a variable-gain amplifier circuit is adjusted in response to a measured value of the camera-to-subject distance, and a video signal supplied from the image pickup device is amplified by this variable-gain amplifier.

BRIEF DESCRIPTION OF THE DRAWINGS

FIG. 2 is a block diagram of the construction of essential portions of an automatic sensitivity controller for an electronic still camera; and FIG. 3 is a flow chart of flash photography process.

DESCRIPTION OF THE PREFERRED EMBODIMENT

An embodiment of the present invention will be described below in detail with reference to the accompanying drawings.

Figure 1:
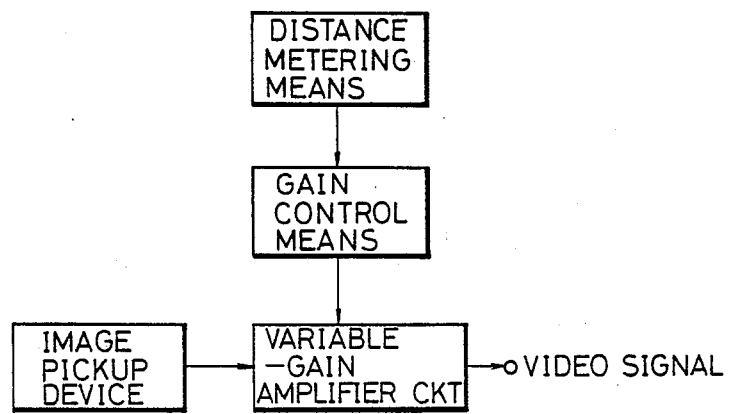
FIG. 1 is a block diagram of the constitution of the present invention.
Figure 2:
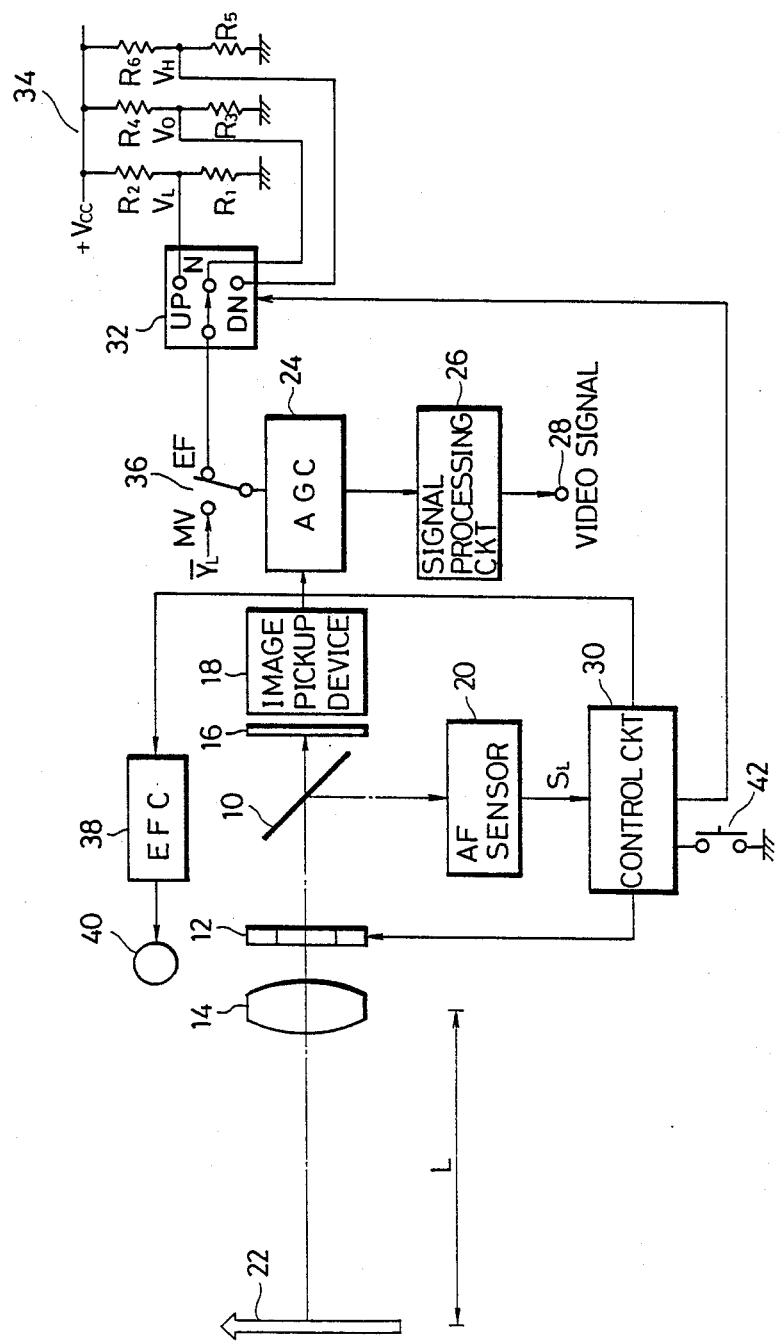
FIGS. 2 and 3 show an embodiment of the present invention.

FIG. 2 shows the construction of essential portions of an automatic sensitivity controller provided in an electronic still camera.

A photographing lens 14 is disposed in front of a half mirror 10 with an aperture 12 interposed therebetween. An image pickup device 18 such as a CCD is disposed at the rear of the half mirror 10 with a shutter 16 interposed therebetween. The half mirror 10 may be of a fixed type or quick-return type. The half mirror 14 is inclined at 45° to the photographing lens 14. An auto-focus sensor 20 is disposed under the half mirror 10.

Light from the subject 22 passes through the photographing lens 14 and then through the aperture 12, and is split into two by the half mirror 10. Light which travels along one of the paths thereby split is introduced to the auto-focus sensor 20, and a distance signal $S_L$ relating to the camera-to-subject distance L is output from the auto-focus sensor 20. If the shutter 16 is opened, light traveling along the other path split by the half mirror 10 forms the image on a light receiving portion of the image pickup device 18.

The image pickup device 18 is driven by a driver (not shown) so that electric change accumulated on light receiving elements of the image pickup device 18 is taken out successively as pixel signals. These signals are amplified by an AGC circuit 24, are supplied to a signal processing circuit 26, and undergo various well-known processes, thereby outputting a suitable video signal through an output terminal 28.

The distance signal $S_L$ output from the auto-focus sensor 20 is supplied to a control circuit 30 which is constituted by a microcomputer. The control circuit 30 calculates the camera-to-subject distance L from the distance signal $S_L$, and changes over a control voltage change-over switch 32 in response to the value of the camera-to-subject distance L so that a control voltage is supplied from a control voltage producing circuit 34 to a control terminal of the AGC circuit 24 via the control voltage change-over switch 32 and a photography mode change-over switch 36, thereby controlling the gain of the AGC circuit 24. The control circuit adjusts the aperture 12 on the basis of this gain, and thereafter triggers an electronic flash circuit 38 to make a discharge tube 40 emit light.

The control voltage producing circuit 34 is formed in such a manner that pairs of resistors $R_1$ and $R_2$, $R_3$ and $R_4$, $R_5$ and $R_6$ each being connected in series are connected in parallel to each other between power supply terminals and that divided voltages $V_L$, $V_O$, and $V_H$ obtained at the connections between series pairs of resistors are respectively supplied to change-over-side terminals UP, N, and DN of the control voltage change-over switch 32. $V_L$, $V_o$, and $V_H$ are in a relationship: $V_L < V_o < V_H$. The terminals UP, N, and DN correspond to a high-sensitivity mode, a standard mode, and a low-sensitivity mode, respectively.

A change-over-side terminal EF of the photography mode change-over switch 36 is connected to a fixedside terminal of the control voltage change-over switch 32, and a signal line through which a control signal $\overline{Y}_L$ is supplied is connected to a change-over terminal MV of the photography mode change-over switch 36. This control signal $\overline{Y}_L$ is formed by processing of the low-band luminance signal $Y_L$ in a detection circuit (not shown).

The AGC circuit 24 is designed in such a manner that the gain of this circuit becomes smaller if the voltage applied to the control circuit becomes higher. This gain corresponds to the speed of a silver salt film. If the gain is increased, the equivalent guide number becomes greater. The range of the photographable camera-to-subject distance L changes depending upon this gain. If the aperture value of the lens ranges from F2.8 to F16 and if the control voltage $V_o$ is applied to the control terminal of the AGC circuit 24, that is, if the equivalent guide number is 12 when the sensitivity is set to the standard-mode level, the photographable camera-to-subject distance L ranges from 0.75 to 4.3 m. If the gain of the AGC circuit 24 becomes higher than the level at the time of the standard mode by 6 dB when the control voltage $V_L$ is applied to the control terminal of the AGC circuit 24, that is, when the standard mode is selected, the equivalent guide number becomes $\sqrt{2}$ times greater than that at the time of the standard mode, that is, it becomes 17 and the range of the photographable camera-to-subject distance L is 1.1 to 6.1 m. If the gain of the AGC circuit 24 becomes lower than the standard-mode level by 6 dB when the control voltage $V_H$ is applied to the control terminal of the AGC circuit 24, that is, when the low-sensitivity mode is selected, the equivalent guide number becomes $1/\sqrt{2}$ times greater than standard-mode level, that is, it becomes 8.5 and the range of the photographable camera-to-subject distance L is 0.53 to 3.0 m.

It is thus possible to expand the range of the photographable camera-to-subject distance L by optimizing the voltage applied to the control terminal of the AGC circuit 24 in response to the measured camera-to-subject distance L. The photographable camera-to-subject distance L ranges from 0.53 to 6.1 m in the above example.

However, if the gain of the AGC circuit 24 is varied over an excessively wide range, problems of a deterioration of the signal-to-noise ratio and saturation of the white level occur. Thus, there is a limit to the variable range depending upon the performance of the image pickup device 18. In the above, example, the setting of the variable range is appropriate.

The operation of the thus-constructed embodiment device will now be described below.

The operation will be first described with respect to a case where a switch (not shown) is operated to select the flash photography mode.

When the flash photography mode is selected, the shutter 16 is closed and the aperture 12 is fully opened. At the same time, the photography mode change-over switch 36 is changed over to the terminal EF. If a release button switch 42 is then pressed, a flash photography program written in a ROM of the control circuit 30 is executed.

Figure 3:
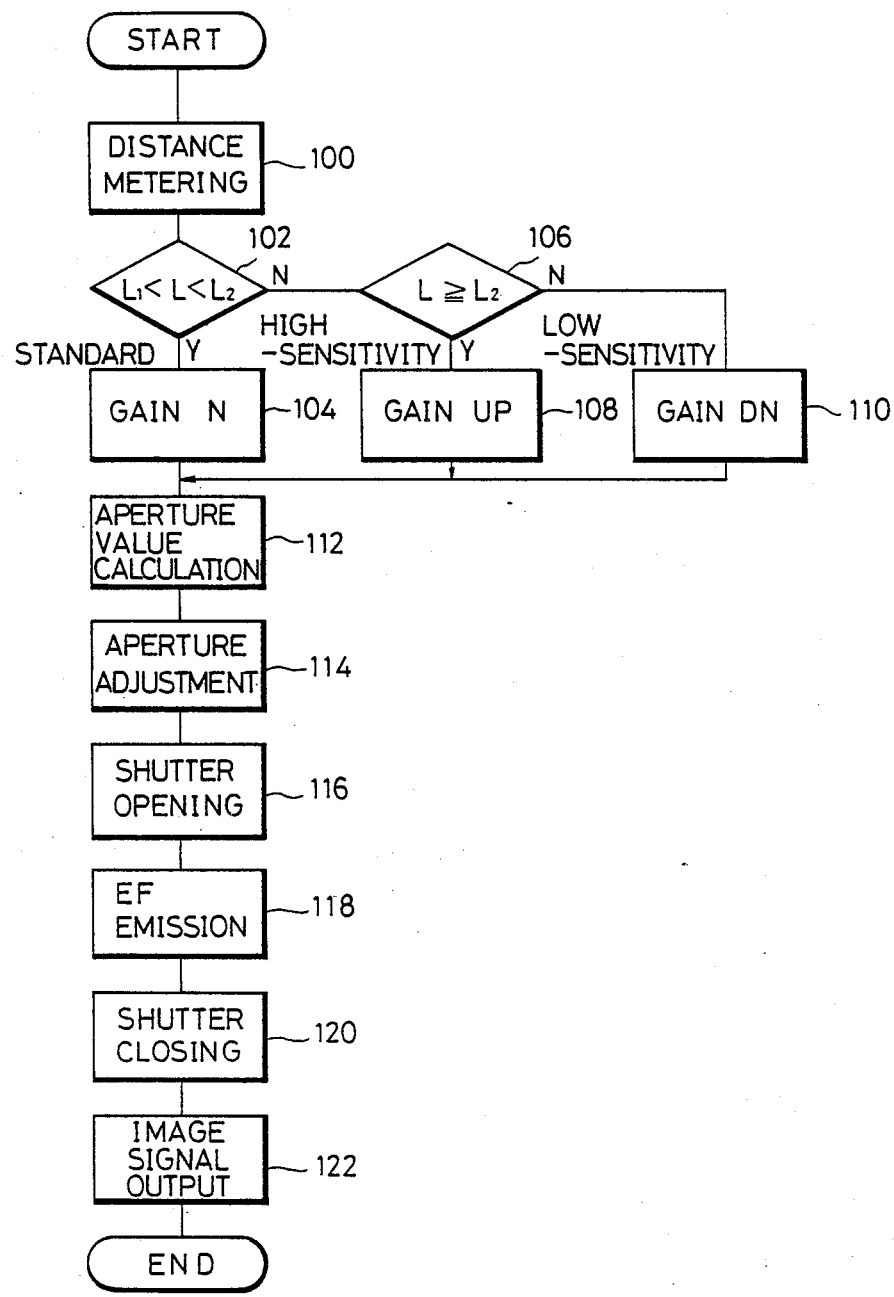

This program corresponds to the flow chart shown in FIG. 3. In step 100, the control circuit 30 reads the distance signal SL supplied from the auto-focus sensor 20, and calculates the camera-to-subject distance L, thereafter conducting focusing.

In step 102, decision is made as to whether the camera-to-subject distance L satisfies $L_1 < L < L_2$ where $L_1$ and $L_2$ are lower and upper limit values of the photographable camera-to-subject distance L when the sensitivity is set to the standard-mode level. In the above example, $L_1 = 0.75$ m and $L_2 = 4.3$ m. If affirmative decision is made in step 102, the control voltage change-over switch 32 is changed over to the terminal N in step 104 and the control voltage $V_o$ is thereby applied to the control terminal of the AGC circuit 24, thereby selecting the standard-mode sensitivity.

If negative decision is made in step 102, decision is made in step 106 as to whether or not $L \geq L_2$. If affirmative decision is made in step 106, the control voltage change-over circuit 32 is changed over to the terminal UP to apply the control voltage $V_L$ to the control terminal of the AGC circuit 24, thereby selecting the high-sensitivity mode. That is, the gain of the AGC circuit 24 is made higher than the standard-mode level so that the equivalent guide number is increased and the upper limit value of the photographable camera-to-subject distance L becomes greater than $L_2$.

If negative decision is made in step 106, that is, $L \leq L_1$ is decided, the control voltage change-over switch 32 is changed over to the terminal DN to apply the control voltage VH to the control terminal of the AGC circuit 24, thereby selecting the low-sensitivity mode. That is the gain of the AGC circuit 24 is made lower than the standard-mode level so that the equivalent guide number is reduced and the lower limit value of the photographable camera-to-subject distance L becomes smaller than $L_2$.

After adjustment operation with respect the sensitivity mode in step 104, 108, or 110, the process proceeds to step 112 to calculate the aperture value in response to the equivalent guide number. The aperture value is obtained by dividing the equivalent guide number by the camera-to-subject distance L.

In step 114, the aperture 12 is adjusted on the basis of the aperture value thereby calculated. After this adjustment has been completed, dark currents are swept off the image pickup device 18, and the process proceeds to step 116 to open the shutter 16. Then, in step 118, the electronic flash circuit 38 is triggered so that the discharge tube 40 emits light and thereby illuminates the subject. Light thereby reflecting on the subject 22 passes through the photographing lens 14 and the opening of the aperture 12 so as to form the image on the image pickup device 18, and is accumulated on the light receiving elements. After the emission has been completed, the process proceeds to step 120 to close the shutter 16.

In step 122, the image pickup device 18 is driven by the driver (not shown) so that video signals output from the pixels at very small levels are successively supplied to the AGC circuit 24 and are suitably amplified therein. The amplified signals undergo various kinds of processing in the signal processing circuit 26 and desired video signals are output through the output terminal 28.

If the movie mode is selected by the operation of the switch (not shown), the shutter 16 is always kept open and the photography mode change-over switch 36 is changed over to the terminal M. The above-mentioned control signal $\overline{Y}_L$ (a signal obtained by extracting the low-band luminance signal $Y_L$ from the output from the AGC circuit 24 and averaging the extracted signal by the detection circuit) is supplied to the control terminal of the AGC circuit 24, and the gain of the AGC circuit 24 is automatically controlled in response to the control signal YL so that the level of the output from the AGC circuit 24 is kept generally constant.

In the above-described embodiment, the present invention is exemplified with respect to flash photography based on the flashmatic system. However, the present invention is not limited to this photographing process and it can be applied to any other processes, for example, flash photography based on an automatic strobe system so long as the gain of the AGC circuit 24 is set to a suitable value in response to the measured camera-to-subject distance L. If an automatic strobe system is adopted, the degree of freedom of selecting the combination of the aperture value and the gain of the AGC circuit 24 in response to the measured camera-to-subject distance L is increased, thereby enabling the exposure to be optimized with respect to the depth of field, the field stop, and so forth.

In the above-described embodiment, the present invention is exemplified with respect to a case where the sensitivity can be changed in three steps. However, the present invention is applicable if the number of sensitivity-change steps is two or more. It is also possible to change the sensitivity continuously.

Automatic sensitivity adjustment may be performed in consideration of the type of electronic flash employed.

In the above-described embodiment, the shutter 16 is of a mechanical type. Instead, an electronic shutter which control the time taken to charge the image pickup device 18 may be employed.

The distance metering system may be of any type selected from various active or passive types of system. The present invention can, of course, be applied to a camera capable of operating in the still mode only.

In accordance with the present invention, the sensitivity of an electronic still camera can be automatically controlled in response to the camera-to-subject distance so that the range of the photographable camera-to-subject distance is expanded.

Since the photographable camera-to-subject distance can be increased without any increase in the amount of light emitted from the electronic flash, it is possible to reduce the overall size of the electronic camera.

What is claimed is:

1. An automatic sensitivity controller for an electronic still camera which performs flash photography, said automatic sensitivity controller comprising:
   an image pickup device;
   distance metering means for measuring the camera-to-subject distance;
   a variable-gain amplifier circuit having a control terminal and amplifying a video signal supplied from said image pickup device at a gain determined in response to a control signal applied to said control terminal;
   a gain control means for applying a control signal relating to a measured value of the camera-to-subject distance to said control terminal, wherein said control signal output from said gain control means is a dc-voltage signal, said gain control means having:
   a control voltage producing circuit having a plurality of output terminals through which a plurality of different dc voltages are taken out in parallel with each other;
   a change-over switch for selectively connecting one of said plurality of output terminals to said control terminal of said variable-gain amplifier circuit in response to a change-over control signal; and
   switch control means for supplying the change-over control signal relating to the measured value of the camera-to-subject distance to said change-over switch;
   said automatic sensitivity controller further comprising:
   an aperture device for adjusting the quantity of light introduced to said image pickup device;
   aperture value calculating means for obtaining an aperture value by dividing an equivalent guide number determined from the gain of said variable-gain amplifier circuit by the measured value of the camera-to-subject distance; and
   aperture control means for controlling said aperture device so that the aperture value of said aperture device becomes equal to the aperture value calculated by said aperture value calculating means.

2. An automatic sensitivity controller according to claim 1, wherein said distance metering means has an auto-focus sensor which outputs a distance signal, and distance calculating means for calculating the camera-to-subject distance by using said distance signal.

3. An automatic sensitivity controller according to claim 1, wherein said control voltage producing circuit outputs dc currents at three different voltages corresponding to three modes: a standard mode; a high-sensitivity mode; and a low sensitivity mode.

4. An automatic sensitivity controller for an electronic still camera which performs flash photography, said automatic sensitivity controller comprising:
   an image pickup device;
   distance metering means for measuring the camera-to-subject distance;
   a variable-gain amplifier circuit having a control terminal and amplifying a video signal supplied from said image pickup device at a gain determined in response to a control signal applied to said control terminal;
   an aperture device having a control terminal and adjusting, in response to the control signal applied to said control terminal, the quantity of light introduced to said image pickup device;
   calculation means for calculating the aperture value and said gain relating to the measured value of the camera-to-subject distance; and
   control means for supplying control signals to said control terminal of said aperture device and said variable-gain amplifier circuits, wherein said control signal output from said control means to said variable-gain amplifier circuit is a dc-voltage signal, said control means having:
   a control voltage producing circuit having a plurality of output terminals through which a plurality of different dc voltages are taken out in parallel with each other;
   a change-over switch for selectively connecting one of said plurality of output terminals to said control terminal of said variable-gain amplifier circuit; and
   control means for supplying the change-over control signal to said change-over switch in order to set said calculated gain.

5. An automatic sensitivity controller according to claim 4, wherein said distance metering means has an auto-focus sensor which outputs a distance signal, and distance calculating means for calculating the camera-to-subject distance by using said distance signal.

* * * * *

UNITED STATES PATENT AND TRADEMARK OFFICE
CERTIFICATE OF CORRECTION

PATENT NO. : 4,903,136

DATED : February 20, 1990

INVENTOR(S) : K. IKETANI

It is certified that error appears in the above-identified patent and that said Letters Patent is hereby corrected as shown below:

On the front page of the patent, please insert the foreign application priority data as follows:

---August 31, 1987 (JP).........62-217535--- column 2, line 19, change "14" to ---10---;
column 4, line 24, change "VH" to ---$V_H$---;
column 4, line 31, insert ---to--- after "respect";
column 4, line 32, change "mode in step" to ---modes in steps---;
column 5, line 1, change "YL" to ---$Y_L$---; and
column 5, line 29, change "control" to ---controls---.

Signed and Sealed this

Third Day of September, 1991

*Attest:*

HARRY F. MANBECK, JR.

*Attesting Officer*  *Commissioner of Patents and Trademarks*